United States Patent [19]

Myers

[11] Patent Number: 5,229,853
[45] Date of Patent: Jul. 20, 1993

[54] SYSTEM FOR CONVERTING A VIDEO SIGNAL FROM A FIRST FORMAT TO A SECOND FORMAT

[75] Inventor: Robert L. Myers, Loveland, Colo.

[73] Assignee: Hewlett-Packard Company, Palo Alto, Calif.

[21] Appl. No.: 746,826

[22] Filed: Aug. 19, 1991

[51] Int. Cl.⁵ .............................................. H04N 7/01
[52] U.S. Cl. ..................................... 358/140; 358/180
[58] Field of Search ............... 358/140, 180, 138, 198, 358/160

[56] References Cited

U.S. PATENT DOCUMENTS

| | | | |
|---|---|---|---|
| 4,204,227 | 5/1980 | Gurley | 358/138 |
| 4,302,776 | 11/1981 | Taylor et al. | 358/180 X |
| 4,598,314 | 7/1986 | Reimers | 358/140 |
| 4,658,284 | 4/1987 | Kawamura et al. | 358/140 X |
| 4,658,293 | 4/1987 | Arai et al. | 358/140 |
| 4,670,772 | 6/1987 | Bolger | 358/140 |
| 4,713,685 | 12/1987 | Nishimura et al. | 358/140 X |
| 4,729,012 | 3/1988 | Jose et al. | 358/180 X |
| 4,766,494 | 8/1988 | Doyle | 358/180 X |
| 4,774,581 | 9/1988 | Shiratsuchi | 358/180 |
| 4,924,315 | 5/1990 | Yamashita | 358/140 X |
| 4,953,025 | 8/1990 | Saitoh et al. | 358/140 |
| 4,962,427 | 10/1990 | Lunn et al. | 358/140 X |
| 5,068,731 | 11/1991 | Takeuchi | 358/140 X |
| 5,070,395 | 12/1991 | Kitaura et al. | 358/140 X |
| 5,087,971 | 2/1992 | Sakata et al. | 358/140 X |
| 5,103,308 | 4/1992 | Asano | 358/140 |
| 5,142,366 | 8/1992 | Brown et al. | 358/180 |

Primary Examiner—Victor R. Kostak
Attorney, Agent, or Firm—Guy J. Kelley

[57] ABSTRACT

An apparatus for converting a video input signal representing an image from a first format to a prescribed second format. The apparatus comprises the following elements: a sync separator (30) for extracting a synchronization (sync) signal from the video input signal; a section (32, 34, 36, 40) for generating a sample clock signal on the basis of the sync signal and the said prescribed format; a sampling section including A/D convertors (18a, 18b, 18c) for sampling the video input signal in accordance with the sample clock signal to obtain a prescribed number of samples per line of the image; a section (20a, 20b, 20c, 22) for combining the samples of at least two different lines to obtain a prescribed number of new lines each of which comprises the said prescribed number of samples per line; and a filtering section (17a, 17b, 17c) for filtering the video input signal so as to effectively horizontally average each line of the image.

14 Claims, 4 Drawing Sheets

_Fig. 4(a)_

_Fig. 4(b)_

SYSTEM FOR CONVERTING A VIDEO SIGNAL FROM A FIRST FORMAT TO A SECOND FORMAT

FIELD OF THE INVENTION

The present invention is generally related to raster-scan video technology and more particularly related to apparatuses and methods for converting an image from a first format to a second format, e.g., an apparatus and a method for converting a high-resolution raster image to an NTSC or PAL-encoded color television signal.

BACKGROUND OF THE INVENTION

The deflection system of a raster-scan cathode ray tube (CRT) includes a deflection yoke that comprises two pairs of coils mounted at right angles to one another. The coils generate magnetic fields to deflect the electron beam horizontally (along the x-axis) and vertically (along the y-axis) across the screen in response to a video signal.

The video signal is received from an external source (e.g., from a receiver or graphics board) and amplified and applied to the CRT gun to generate a varying-intensity electron beam. The deflection yoke is driven by separate horizontal and vertical deflection circuits. The horizontal circuit supplies a sawtooth-shaped current to the horizontal yoke coils to scan the beam across the CRT, then quickly return it to the other side to begin the next scan line. The vertical deflection circuit performs a similar function with the vertical coils of the yoke, but of course returns the beam at a lower frequency.

The raster-scan CRT also includes a sync separator. To produce a meaningful image the beam must be swept across the screen at the same rate each time, and this must be synchronized so that the rows and columns of pixels that make up the image are arranged as intended. Such synchronization information is provided by the video source in the form of synchronization pulses, or "sync" pulses, which signify the start of a new line or a new frame. These may be separately supplied, e.g., with TTL lines, or may be encoded into the video signal. Most high-resolution displays use such encoded, or composite, video signals.

Figure 1A:
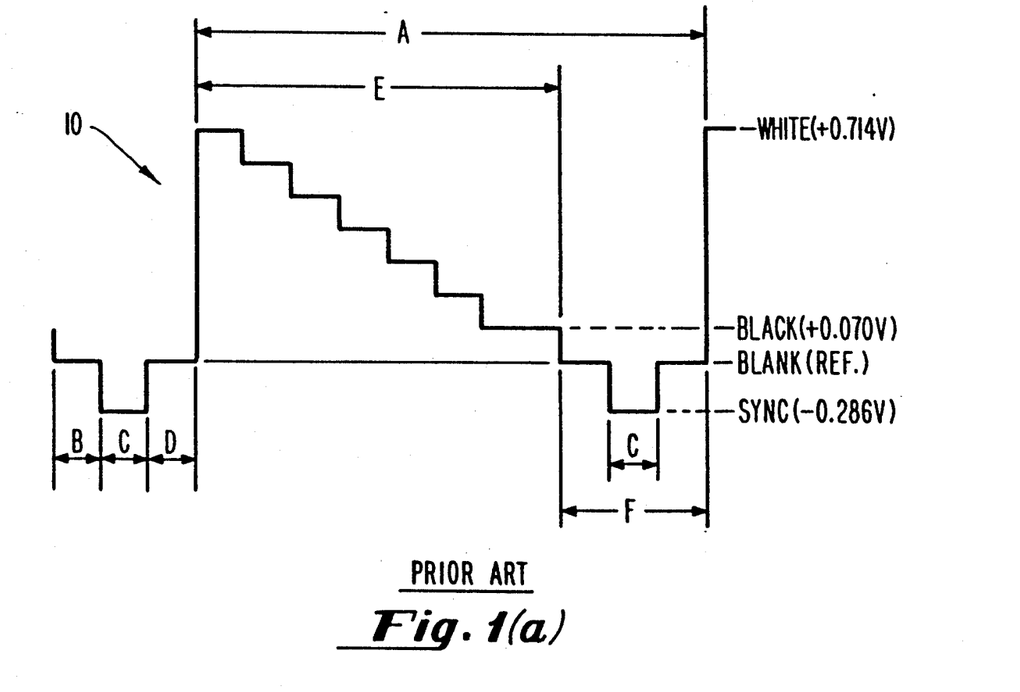
FIGS. 1(a) and 1(b) depict a standard composite-sync video signal.
Figure 1B:
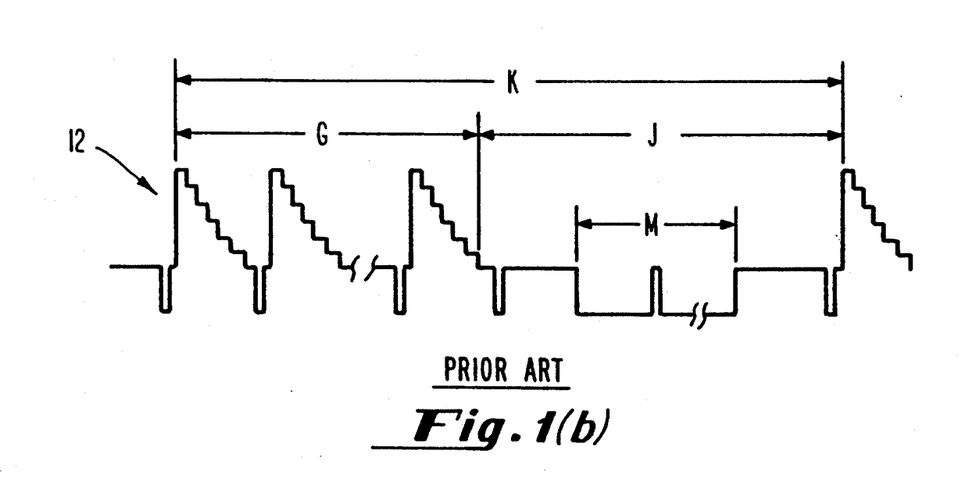

The standard for such composite video signals (actually one of the more common of several standards) is illustrated in FIGS. 1(a) and 1(b). FIG. 1(a) depicts a portion 10 of a video signal corresponding to one scan line and FIG. 1(b) depicts a portion 12 corresponding to several scan lines. The blanking level, labelled "BLANK (REF.)" in FIG. 1(a), is considered the reference. The display should turn off the beam when a signal at that level is presented. Slightly above the BLANK level (about +0.070 V) is the BLACK level. The BLACK level is the lowest level allowed for the "normal video" range encountered during the "active" portion E of the image. All signal levels between the BLACK level and the reference white level (WHITE), which is 0.714 V above the BLANK level, are expected to be displayable by the monitor.

The onset of a synchronization pulse is indicated when the video signal drops below the blanking level. The level of the sync pulse peaks (labelled "SYNC") are defined to be 0.286 V negative with respect to the blanking level, for an overall signal amplitude (SYNC to WHITE) of IV p—p.

To distinguish between video and sync levels, the display must keep track of the DC blanking level (BLANK), which is difficult to do when the inputs are typically AC coupled. Most designs get around this problem by sampling the signal level just after the sync pulse, when the signal is expected to be at the blanking level, i.e., in the interval D just after the interval C, and then holding this level as a reference. The signal is also expected to be at the blanking level for a short period B before the sync pulse, since blanking both before and after the sync pulse guarantees that the retrace lines will not be visible to the user. These are known as the front porch and back porch of the sync signal, with the entire period F between two lines of visible video called the horizontal blanking interval. There is both a horizontal and a vertical blanking interval specified for any video signal format/timing. In FIG. 1(b), the interval G corresponds to several scan lines, the interval J is the vertical blanking interval, the interval K corresponds to one frame, i.e., one complete image, and the interval M corresponds to the vertical blanking signal. The screen is refreshed at 60 Hz (i.e., each line is scanned once every 16.667 ms) in most modern computer graphics displays. In Europe, with a 50 Hz standard AC line frequency, refresh rates are often 50 Hz.

By far the most exciting advantage of the CRT over other display technologies is its ability to produce images in brilliant, lifelike color. This is particularly important in the computer graphics field, where color is used not only to produce lifelike images, but also to highlight text areas, display attention-getting warnings, etc. Color CRTs make use of the fact that the eye will perceive the proper combination of red, green, and blue light as white, and that other combinations will produce other intermediate colors; thus the color CRT has three guns, one each for red, green, and blue, and three separate phosphors to match.

The field of computer graphics has increased the importance of being able to display high-resolution images. Such images require a higher density of pixels than the 640×480 NTSC standard. It is often necessary, however, to convert such high-resolution images to a commonly used format, such as an NTSC, PAL or SECAM-encoded color television signal, for the purposes of display and/or recording via conventional videotape. Unfortunately, presently available devices to perform such conversion (e.g., the Folsom Research card employed by Hewlett Packard Company on its series 300 computers) are typically limited to a narrow range of input signal formats, i.e., they require that the resolution and horizontal and vertical sync rates of the high-resolution image be within a narrow prescribed range. Other devices will convert over a wide range of input signal formats/timings, but those devices place raw digital data obtained by sampling the input video signal into a large frame buffer and then downsample the stored data into a second frame buffer. The use of two frame buffers makes such devices too expensive for many applications.

Accordingly, a primary goal of the present invention is to provide an apparatus and a method for efficiently and inexpensively converting a wide range of high-resolution input signals to a commonly used format. The present invention achieves this goal.

SUMMARY OF THE INVENTION

The present invention encompasses apparatuses for converting a video input signal representing an image from a first format to a prescribed second format. An apparatus in accordance with the present invention comprises the followings elements: (a) sync separator means for extracting a synchronization (sync) signal from the video input signal; (b) clock means for generating a sample clock signal on the basis of the sync signal and the said prescribed format; (c) sampling means for sampling the video input signal in accordance with the sample clock signal to obtain a prescribed number of samples per line of the image; and (d) combining means for combining the samples of at least two different lines to obtain a prescribed number of new lines each of which comprises the said prescribed number of samples per line, whereby an array of image samples representing the image may be obtained.

A first preferred embodiment of the present invention further comprises filtering means for filtering the video input signal so as to effectively horizontally average each line of the image.

A second embodiment of the present invention further comprises frame buffer means for storing the samples as an array of image samples.

Another embodiment of the present invention further comprises encoder means for encoding the samples to form a video output signal in accordance with the prescribed format.

In still another embodiment of the present invention the filtering means is arranged to filter the video input before the video input signal is sampled.

In another embodiment of the present invention the filtering means is arranged to filter the video input after the video input signal is sampled.

Yet another embodiment of the present invention further comprises means for extracting horizontal and vertical sync and blank signals from the input video signal, counter means for providing counts of the horizontal and vertical sync and blank signals, processor means for providing a control signal on the basis of the counts, and phase-locked loop means coupled to the processor means for generating the sample clock signal on the basis of the horizontal sync signal and the control signal.

In still another embodiment of the present invention the combining means comprises FIFO line buffer means for storing at least first and second sets of samples representing respective lines of the image and means for providing a third line representing a weighted average of the first and second lines.

The present invention also encompasses methods for converting a video input signal from a first format to a prescribed second format. A method in accordance with the invention comprises the following steps: (a) extracting a sync signal from the video input signal; (b) generating a sample clock signal on the basis of the sync signal and the prescribed format; (c) sampling the video input signal in accordance with the sample clock signal to obtain a prescribed number of samples per line of the image; and (d) combining the samples of at least two different lines to obtain a prescribed number of new lines each of which comprises the prescribed number of samples per line.

Other features and advantages of the invention are described below.

DETAILED DESCRIPTION OF PREFERRED EMBODIMENTS

Only conversion to NTSC or (NTSC-rate) video will be covered in the following description of preferred embodiments, however it should be apparent that the techniques described are equally applicable to other formats, such as PAL or SECAM. It will be assumed that an NTSC frame consists of square pixels arranged in a 640×480 array. For digital storage of such a frame, each pixel must be stored as multiple bits that contain the RGB color information, but the number of bits to be stored is irrelevant to the problem of format/timing conversion. As described more fully below, the input signal is stored in an appropriately-sized frame buffer and then read out at the lower resolution rates for encoding. Further, unless the input signal timing is known, there must be a means for correctly sampling and storing that image into the frame buffer. A means for properly sampling and averaging a signal of greater than the final 640×480 resolution is also required, especially if the original format does not consist of an integral multiple of those values (such as a 1280×960 image).

Two basic problems are encountered in attempting to devise a "universal" convertor, i.e., one which will produce a correct output over a wide range of input signal timing:

First, the proper sampling rate appropriate to the input signal timing must be determined.

Second, a means of properly averaging the (presumably) higher-resolution image down to the 640×480 format must be provided.

Figure 2:
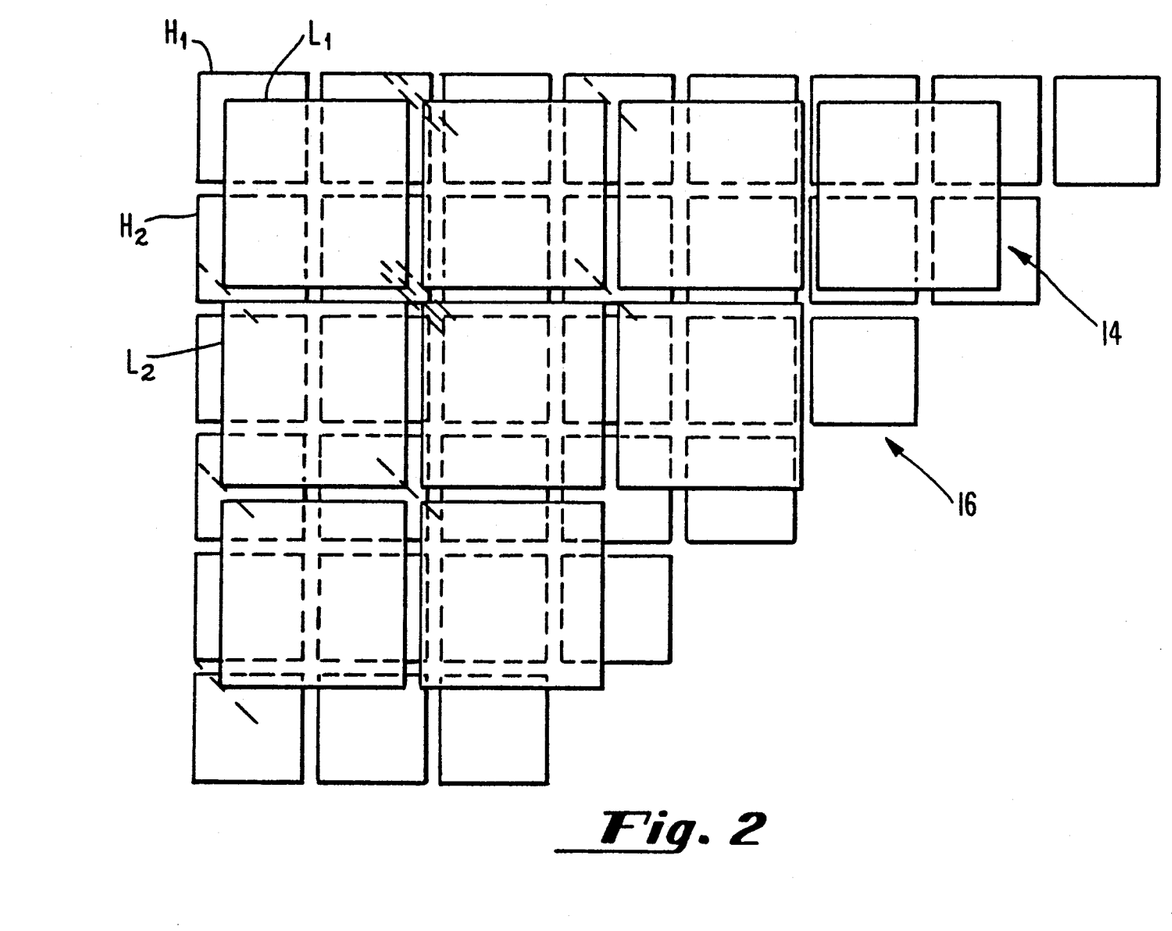
FIG. 2 depicts how pixels of a high-resolution image are mapped to pixels of a lower-resolution image in accordance with the present invention.

These problems are illustrated in FIG. 2, in which the pixels $L_1, L_2, \ldots$ of a 640×480 image 14 are overlaid on pixels $H_1, H_2, \ldots$ of a 1024×768 image 16. Image 14 represents the final lower resolution raster image and image 16 represents a hypothetical high-resolution image to be converted. It is apparent that, while the two images are of the same aspect ratio, the pixels of the 640×480 image 14 do not cover an integral multiple of the smaller pixels of the 1024×768 image 16. This will require that the smaller pixels of the original image 16 be combined in groups to form the proper respective values for the pixels in the final image 14 (e.g., using a weighted average in both the x (horizontal) and y (vertical) directions, as described below). It should be noted that, if averaging is used, the averaging weights Will not be the same for each pixel; e.g., pixel $L_1$ of the lower resolution image 14 requires a greater contribution from pixel $H_1$ of the original image 16, as compared with the relation between pixel $L_2$ of the lower resolution image and the corresponding pixel $H_2$ of the original image. It should also be noted that, for any given range of original image resolutions, there will be only a small number of pixels that need to be averaged from the original to the converted image.

For example, if the conversion should function over a range of original image resolutions of 640×480 to 1280×1024, then no more than two pixels in the x direction and three in the y will ever contribute to any given pixel in the final image. Thus, if such averaging can be performed "on the fly," i.e., at the display rate of the original image, there will be no need to store more than three scan lines of the original image 16. Moreover, conversion along each horizontal line of the original image can be carried out by sampling the scan lines along the x axis at the appropriate sampling rate and low-pass filtering the resulting data such that 640 samples are obtained for each line of the original (alternatively, one could low-pass filter the analog signals before sampling). This is achieved in the embodiment described below by varying the sampling rate in accordance with the horizontal line rate (i.e., the frequency of the horizontal sync pulse) of the original video signal.

Figure 3:
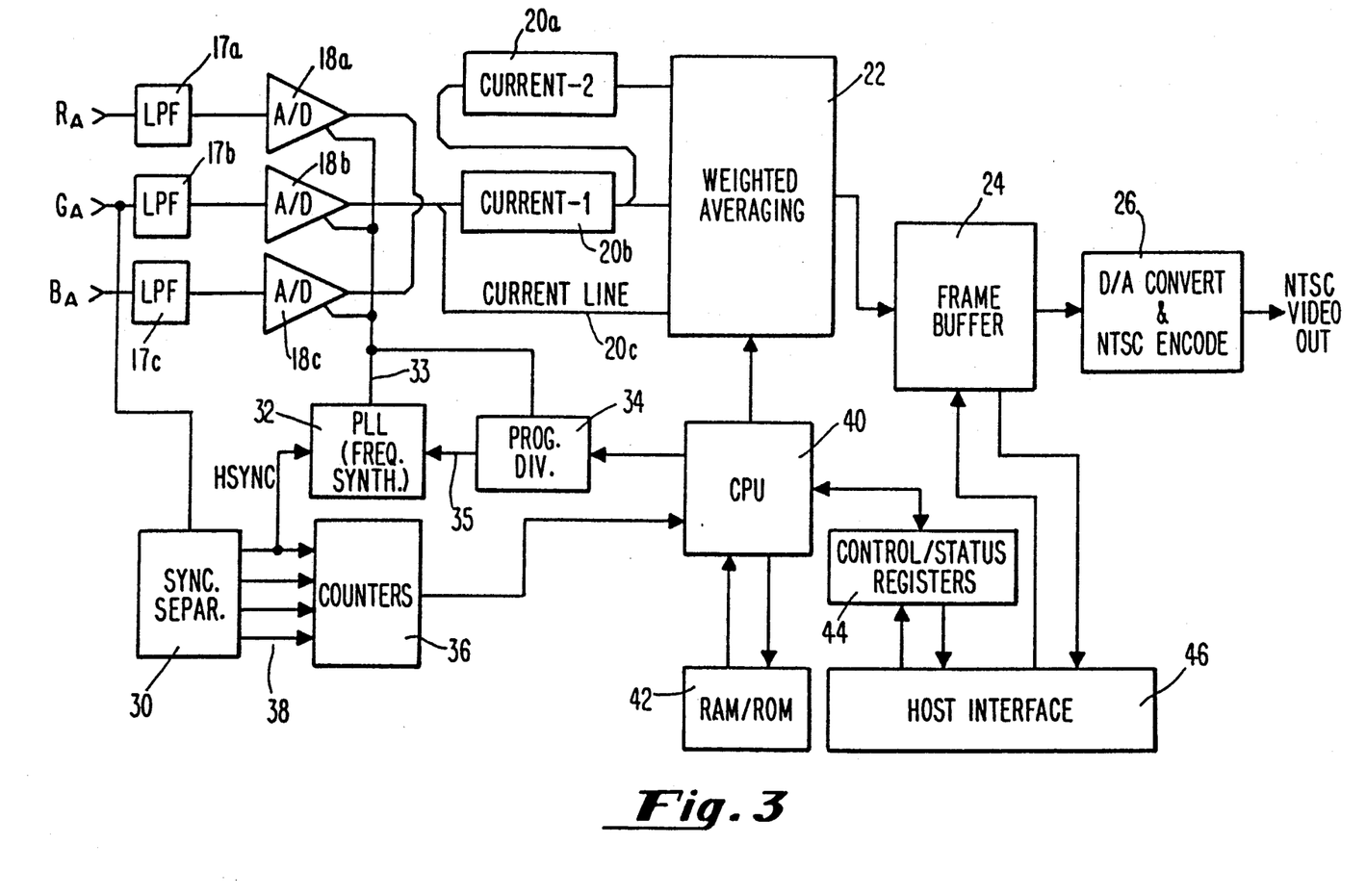
FIG. 3 is a block diagram of a universal video output device in accordance with the present invention.

FIG. 3 is a block diagram of a conversion system based upon the foregoing principles. The system is adapted to receive red, green and blue analog high-resolution video signals via lines $R_A$, $G_A$, $B_A$, respectively, and to convert these signals to a lower resolution video signal and output that signal via line 28 to, e.g., a low resolution display or video tape machine (neither of which are shown).

The system comprises the following components:

low-pass filters 17a, 17b, 17c; analog to digital convertors (A/Ds) 18a, 18b, 18c;

first in-first out (FIFO) line buffers 20a, 20b and bus 20c;

weighted averaging block 22, e.g., a Brooktree 3×3 matrix multiplier;

frame buffer 24 (which should be be capable of storing 640×480 N-bit pixels, where N represents the number of pixels required to achieve the desired level of color fidelity);

digital to analog convertor/NTSC encoder block 26;

sync separator 30;

phase-locked loop (PLL) frequency synthesizer 32;

programmable divider 34 (note that this component may be part of the PLL 32 or in addition to a fixed divider that is part of the PLL);

counter block 36;

bus 38 for carrying horizontal and vertical sync and blank signals;

CPU 40;

RAM/ROM memory 42;

control/status registers 44; and host interface 46.

In the system of FIG. 3, the horizontal sync and blanking signals are derived from the incoming video signal received via lines $R_A$, $G_A$, $B_A$ (these may be either separated from a composite sync-on-green signal, as shown, or obtained from discrete inputs) and sent to a timing control unit comprising the PLL 32, programmable divider 34 and counter block 36. Block 36 will typically include several counters.

The microprocessor 40 monitors the outputs of the counter block 36, which are clocked on the output of the digital PLL. The programmable divider 34 samples the output of the PLL 32 via line 33 and feeds back a divided-down voltage via line 35 to a phase comparator (not shown, but which is typically an EXOR gate) of the PLL. The divider 34 is set by processor 40 so that the PLL 32 outputs 640 clock pulses during each horizontal active interval (i.e., the interval E between the horizontal blanking intervals, as shown in FIG. 1). The counter block 36 totals the horizontal active and blanking intervals relative to this variable clock. Once that relation is established, the sampling rate is set by feeding the PLL's output signal via line 33 to respective clock inputs of the A/Ds 18a, 18b, 18c.

Additional counters in counter block 36 are used to determine the vertical active and blanking intervals under the supervision of the processor 40. Once those are determined, the processor will have sufficient information about the sampling rate and input format to correctly establish the averaging algorithm to be used in converting the high-resolution input signal. Since the sampling rate will have been set, the processor will only have to determine the weighting pattern to be used in combining (averaging) sampled pixels from adjacent lines to determine the values of the final lower resolution pixels. That will likely require a fairly small number of weighting patterns to obtain acceptable results for any input image resolution within the design range (which in the present example is 640×480 to 1280×1024).

With the conversion parameters established, the conversion process will proceed as follows: The incoming video signals are sampled at the selected rate and the resulting digital data is placed in FIFO buffer 20b. This continues until the second line of incoming video begins to be sampled. This data (the second line) is sent both to the FIFO buffer 20b and "around" it via line 20c so that the second line may be averaged (by block 22) with the first line, with the averaging weights set by the processor 40 during the blanking interval between the first and second lines. The result of the averaging will either be stored in the frame buffer 24 (as the final lower resolution image), or, if the "NTSC pixels" span more than two lines of the original image, sent to FIFO 20a to permit another averaging process with pixels from the third line of the original image. The third-line pixels will be sent to FIFO 20b, so that the averaging process can continue for successive lines. After the complete frame has been sampled, a correctly converted 640×480 image representation will exist in the frame buffer 24. That image may be converted to NTSC-encoded video by conventional means, depicted as block 26.

It should be noted that the just-described method employs a line-locked sampling rate derived from the horizontal frequency of the incoming signal. This technique results in a stable digitization process, even with fairly poor video sources, and the sampled pixels will likely be in an orthogonal array.

There is still the problem of converting images that have a different aspect ratio than the 4:3 NTSC standard, e.g., a 5:4 1280×1024 image. Here, the processor 40 will recognize the format mismatch and, depending upon how it is programmed (or possibly under control of a host computer via host interface 46 and control/status registers 44), either alter the sampling rate and averaging process to compress or expand the image to fit, or, if linearity must be preserved, either ignore an appropriate number of lines at the top and/or bottom of the image or perform the equivalent of "letterboxing," in which the full 480 lines of 640 pixels of the frame buffer 24 are not used and the image is centered between two blank bars at top and bottom or left and right.

Given that the conversion system described is capable of converting input signals over a wide range of formats, it may be modified to include an input switch (not shown) to select from several sources of different timings/formats, under control of a host system (not shown) via host interface 46. To achieve this, the host would send a command to select a new source to the convertor, which would then wait for the next vertical blanking interval of the current source. At that time, an entry of new data into the frame buffer 24 would be halted, freezing the last frame from the current source. The processor 40 would then cause the input switch to select the new source and change the sampling rate and set up the averaging scheme for the new timing. Conversion of video from the new source would then begin immediately after the next vertical blanking signal from that source is detected.

Several additional items concerning a practical implementation of the system as a product should be mentioned. First, the maximum frequencies involved for the desired range of operation must be determined and the parts used in the sampling and line buffer sections considered. Second, practical averaging techniques should be considered. Finally, the organization of the frame buffer must be examined.

To determine the maximum frequency of operation for the A/Ds 18a, 18b, 18c and line buffers 20a, 20b, the intended range of input signal to be covered must be selected. A practical range would be, e.g., from the 31.5 kHz VGA format to the 1280×1024 pixel, 72 Hz standard now being used in Hewlett-Packard Company (HP) graphics systems. The sampling rate should be such that 640 samples occur during the horizontal active time, which is about 9.5 microseconds for the 1280×1024 72 kHz format. This would require a sample clock of $640/(9.5 \times 10e-6)$, or slightly over 67 MHz. Similarly, the slowest sample rate expected for this range would be about 25 MHz. Unfortunately, 67 MHz is too fast for any FIFO suited for use as the line buffer. The first choice for the FIFO buffers 20a, 20b is a Texas Instruments (TI) 18-bit 1k part. The fastest of those is a 40 MHz part, so two multiplexed parts must be used for each line buffer. Depending upon the number of bits per sample, however, there may be no need to parallel multiple FIFOs to obtain a wider data path. If six bits per channel results in adequate color fidelity, the single 18-bit-wide FIFO would be sufficient. A minimum of four parts would be required, given the need for the two line buffers 20a, 20b.

The averaging scheme must be capable of averaging three samples at a time, with programmable weighting, at the rate at which the samples come from the line buffers 20a, 20b. This could either be the 33.5 MHz rate derived from the 2:1 multiplexing of line buffers 20a, 20b, or an additional 2:1 multiplex could be performed at this point for a 16.8 MHz rate. As mentioned above, the weighting used in the averaging scheme will vary from pixel to pixel, however it is possible that acceptable results may be obtained with relatively few weighting schemes, which would be selected "on the fly" by the processor 40. Note that the averaging is carried out between lines (in other words, only along the y-axis), as "averaging" along the x-axis is carried out in the sampling process (although some selectable filtering may need to be employed on the inputs for the best results).

If six bits per sample are used, then the averaging scheme will have to weight each of three samples and average them at the rates mentioned above. The weighting scheme employed may be selected by additional control bits. If sixteen different interline weightings prove to be adequate to cover all cases within the range of the system, then a total of 22 bits of information would be supplied to the averaging system for each R, G, B output (the six bits from each sample from each of three lines to be averaged plus the four control bits). The averaging could be performed via an ASIC or gate array or via RAM or ROM look-up tables stored in memory 42, although to keep the size of each table and the access times within practical ranges it would likely require a two-step averaging process.

The frame buffer 24 organization and control must meet a few simple criteria: First, the frame buffer must be capable of accepting data from the output of the averging block at a sufficiently high rate. It must also be deep enough (i.e., have enough bits per pixel) to support the desired resolution in the lower resolution image and it must be capable of supplying output data to the NTSC encoder block 26 at the appropriate rate. In addition, as the video input and NTSC output may be assumed to be completely asynchronous, some scheme for permitting both accesses within the allotted time frames must be included.

Fortunately, all of these requirements are easily met with a simple organization of conventional VRAMs. Twelve conventional VRAMs are sufficient for a 640×480×24 frame buffer organized to allow access to four pixels at once. At the maximum sampling rate, four pixels will be available to be stored in the frame buffer every 59 ns, while the NTSC output will require four pixels once every 325 ns. (This assumes 640 pixels in the standard NTSC active time of approximately 52 $\mu$s. The timing for PAL and SECAM outputs would be slightly faster, as more pixels would be required in a slightly longer active line time.) The $-10$ Toshiba VRAMs have cycle times of 180 ns and 30 ns minimum for the random and serial ports, respectively, which suggests that the serial port be used for transferring data in to the frame buffer and the random port be used for transferring data out of the frame buffer to the NTSC converter block 26. The transfer from the line buffers 20a, 20b to the frame buffer 24 should be stayed until the completion of any current output transfer, which is achievable since such a transfer will occur during the horizontal blanking interval of the input video, and so new new data will be entering the serial port.

It should also be possible to permit access to the random port by a host computer (not shown), which would permit the reading and modification of the lower resolution image, or writing directly to one or more planes of the frame buffer 24 in place of storing "converted" video. (If the full 24 bits/pixel are not required to store the converted image, the unused planes (bits) could be used by the host as overlays on top of the lower resolution image, given the appropriate output circuits.)

One additional enhancement to the basic conversion scheme should be discussed. For best appearance of the final lower resolution image, simple averaging or low pass filtering along either axis is insufficient, due to the fact that sharp edges (e.g., a transition from black to white in a single pixel or line in the original image) will be blurred by this process. On the other hand, some filtering is required to prevent artifacts (unintended lines) from appearing in the converted image in those regions which have gradual transitions in brightness or color in the original. Thus, both filtering/averaging and some means for preserving both vertical and horizontal edges need to be provided.

Figure 4A:
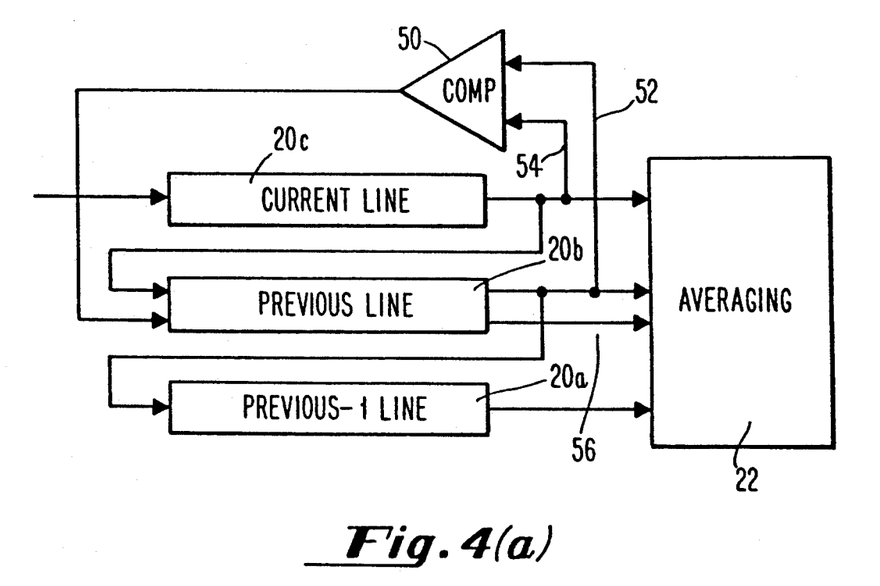
FIG. 4(a) is a block diagram of a portion of a circuit for detecting horizontal edges in the image to be converted.

Preserving a horizontal edge is the easier task. A scheme for performing such a task is depicted in FIG. 4(a). Since line buffers 20a, 20b provide easy access to the line immediately preceding the current line, a simple comparison of data values (by comparator 50) from the two lines will detect a horizontal edge. For example, comparison of the two most significant bits of each color (obtained via line 52, 54) would show a rapid transition in either direction for that color. The results of this comparison for each pixel in the two lines would be stored as a single bit in the line buffer 20b along with the data from the line where the transition occurs. The presence of a set bit in this position would then be used to trigger a modification or bypassing of the averaging procedure for that line. The set bit would be input to averaging block 22 via line 56.

Figure 4B:
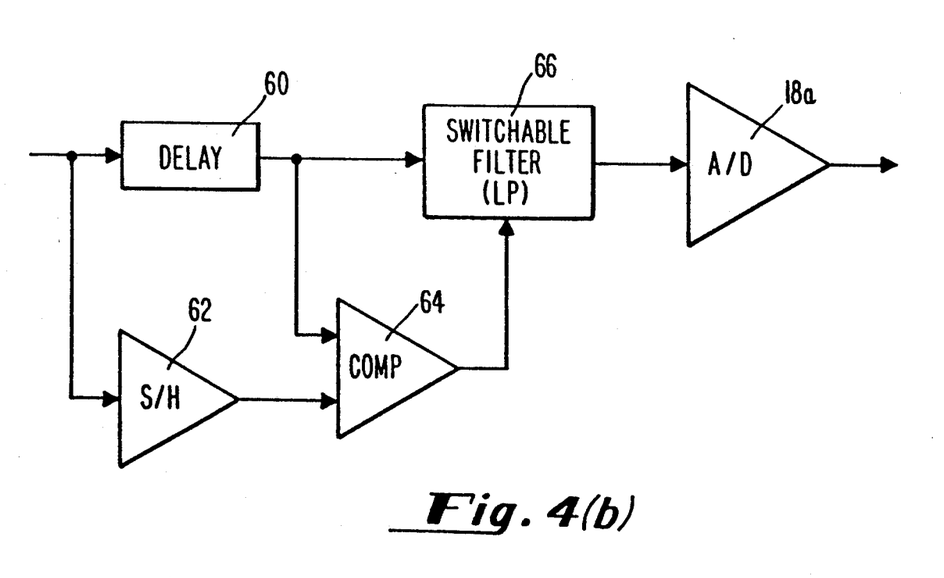
FIG. 4(b) is a block diagram of a portion of a circuit for detecting vertical edges in the image to be converted.

The detection of a vertical edge cannot be done by an examination of the digital data, as the fact that this data is already filtered and sampled at a rate lower than the original pixel rate means that rapid transitions are likely to be missed. Instead, the detection of edges (rapid changes in the intensity of any color) must be accomplished with the analog signal, prior to A/D conversion. Detection of such a transition would then force the A/Ds 18a, 18b, 18c to receive an input equal to the value immediately after the edge, rather than a filtered signal. A possible implementation of such an analog edge detector is shown in FIG. 4(b). Here, each input signal is delayed by block 60 prior to input to the A/D converters (A/D 18a is shown as an example). The delay is equal to the length of the shortest pixel time expected over the range of allowable input signal formats. An analog sample/hold (S/H) circuit 62 samples the input signal, prior to the delay, at a rate sufficiently high so as to capture any transition in the original signal, and the output of the sample/hold circuit is compared (via comparator 64) to the delayed signal. Should this comparison detect an edge (by a large change between the delayed and current values), the sample/hold circuit's clock is disabled, so that the new value is maintained, and this value is substituted for the filtered signal at the input to the A/D converter.

Finally, it should be noted that many modifications and variations of the above-described preferred embodiments are within the true scope of the present invention as set forth in the following claims.

What is claimed is:

1. An apparatus for converting a video input signal representing an image from a first format to a prescribed second format, comprising:

(a) sync separator means for extracting a synchronization (sync) signal from the video input signal;

(b) clock means for generating a sample clock signal on the basis of the sync signal and the said prescribed format, said clock means comprising a phase-locked loop (PLL), programmable divider means for sampling outputs of the PLL and feeding back a divided-down voltage to the PLL, counter means for totalling horizontal active and blanking intervals of the incoming video signal and generating outputs indicative of said intervals, and microprocessor means for monitoring the outputs of said counter means and setting said programmable divider means such that said PLL outputs a prescribed number of clock pulses during a horizontal active interval of the video input signal, said sampling clock signal being derived from said clock pulses;

(c) sampling means for sampling the video input signal in accordance with the sample clock signal to obtain a prescribed number of samples per line of the image; and (d) combining means for combining the samples of at least two different lines to obtain a prescribed number of new lines each of which comprises the said prescribed number of samples per line, whereby an array of image samples representing the image may be obtained.

2. An apparatus for converting a video input signal representing an image from a first format to a prescribed second format, comprising:

(a) sync separator means for extracting a synchronization (sync) signal from the video input signal;

(b) clock means for generating a sample clock signal on the basis of the sync signal and the said prescribed format, said clock means comprising a phase-locked loop (PLL), programmable divider means for sampling outputs of the PLL and feeding back a divided-down voltage to the PLL, counter means for totalling horizontal active and blanking intervals of the incoming video signal and generating outputs indicative of said intervals, and microprocessor means for monitoring the outputs of said counter means and setting said programmable divider means such that said PLL outputs a prescribed number of clock pulses during a horizontal active interval of the video input signal, said sampling clock signal being derived from said clock pulses;

(c) sampling means for sampling the video input signal in accordance with the sample clock signal to obtain a prescribed number of samples per line of the image;

(d) combining means for combining the samples of at least two different lines to obtain a prescribed number of new lines each of which comprises the said prescribed number of samples per line, whereby an array of image samples representing the image may be obtained; and (e) filtering means for filtering the video input signal so as to effectively horizontally average each line of the image.

3. The apparatus recited in claim 2, further comprising:

(f) frame buffer means for storing the samples as an array of image samples.

4. The apparatus recited in claim 3, further comprising:

(g) encoder means, coupled to said frame buffer means, for encoding the samples to form a video output signal in accordance with the prescribed format.

5. The apparatus recited in claim 2, wherein said filtering means is arranged to filter the video input before the video input signal is sampled.

6. The apparatus recited in claim 2, wherein said filtering means is arranged to filter the video input after the video input signal is sampled.

7. The apparatus recited in claim 2 or claim 4, wherein said combining means comprises FIFO line buffer means for storing at least first and second sets of samples representing respective lines of the image and means for providing a third line representing a weighted average of said first and second lines.

8. A method for converting a video input signal representing an image from a first format to a prescribed second format, comprising the steps of:
   (a) extracting a synchronization (sync) signal from the video input signal;
   (b) generating a sample clock signal on the basis of the sync signal and the said prescribed format, said generating step comprising the following sub-steps: extracting horizontal and vertical sync and blank signals from the input video signal, generating counts of said horizontal and vertical sync and blank signals, providing a control signal on the basis of said counts, and generating said sample clock signal on the basis of said horizontal sync signal and the control signal;
   (c) sampling the video input signal in accordance with the sample clock signal to obtain a prescribed number of samples per line of the image; and
   (d) combining the samples of at least two different lines to obtain a prescribed number of new lines each of which comprises the said prescribed number of samples per line.

9. A method for converting a video input signal representing an image from a first format to a prescribed second format, comprising the steps of:
   (a) extracting a synchronization (sync) signal from the video input signal;
   (b) generating a sample clock signal on the basis of the sync signal and the said prescribed format, said generating step comprising the following sub-steps: extracting horizontal and vertical sync and blank signals from the input video signal, generating counts of said horizontal and vertical sync and blank signals, providing a control signal on the basis of said counts, and generating said sample clock signal on the basis of said horizontal sync signal and the control signal;
   (c) sampling the video input signal in accordance with the sample clock signal to obtain a prescribed number of samples per line of the image;
   (d) combining the samples of at least two different lines to obtain a prescribed number of new lines each of which comprises the said prescribed number of samples per line; and
   (e) filtering the video input signal so as to effectively horizontally average each line of the image, said filtering performed prior to said combining step.

10. The method recited in claim 9, further comprising the step of:
    (f) storing the samples so as to form an array of image samples.

11. The method recited in claim 10, further comprising the step of:
    (g) encoding the array of image samples to form a video output signal in accordance with the prescribed format.

12. The method recited in claim 9, wherein said filtering is performed before the video input signal is sampled.

13. The method recited in claim 9, wherein said filtering is performed after the video input signal is sampled.

14. The method recited in claim 9 or claim 11, wherein said combining step (d) comprises buffering at least first and second sets of samples representing respective lines of the image and providing a third line representing a weighted average of said first and second lines.

* * * * *